United States Patent
Momoda et al.

(10) Patent No.: US 6,194,511 B1
(45) Date of Patent: Feb. 27, 2001

(54) PHOTOCHROMIC CURABLE COMPOSITION

(75) Inventors: Junji Momoda; Tadashi Hara, both of Tokuyama (JP)

(73) Assignee: Tokuyama Corporation, Yamaguchi-Ken (JP)

( * ) Notice: Subject to any disclaimer, the term of this patent is extended or adjusted under 35 U.S.C. 154(b) by 0 days.

(21) Appl. No.: 09/260,005

(22) Filed: Mar. 2, 1999

(30) Foreign Application Priority Data

Mar. 2, 1998 (JP) .................................................. 10-049176
Jun. 26, 1998 (JP) .................................................. 10-180390

(51) Int. Cl.⁷ ............................. C08L 51/00; C08F 12/30
(52) U.S. Cl. .......................... 524/539; 252/586; 526/289
(58) Field of Search ........................... 252/586; 524/539; 526/289

(56) References Cited

U.S. PATENT DOCUMENTS

| 4,939,218 | * | 7/1990 | Kawaki et al. ........................ 526/289 |
| 5,683,628 | * | 11/1997 | Mizuno et al. ........................ 252/586 |
| 5,708,064 |   | 1/1998 | Coleman et al. . |

FOREIGN PATENT DOCUMENTS

| 4011868 | 10/1991 | (DE) . |
| 0273710 | 7/1988 | (EP) . |
| 0482572 | 4/1992 | (EP) . |
| 0708164 | 4/1996 | (EP) . |
| 0795765 | 9/1997 | (EP) . |
| 1588656 | 4/1981 | (GB) . |

* cited by examiner

Primary Examiner—Kriellion Sanders
(74) Attorney, Agent, or Firm—Sherman & Shalloway

(57) ABSTRACT

The present invention relates to a photochromic curable composition suited for the production of a photochromic cured product having excellent optical properties such as a high refractive index and a large Abbe's number, having favorable photochromic properties such as a large color density, and having good fatigue resistance, and to a photochromic lens obtained by curing the photochromic curable composition. The photochromic curable composition is characterized by comprising 100 parts by weight of a polymerizable monomer containing at least 10% by weight of a sulfur-containing (meth)acrylate polymerizable monomer represented by the following general formula (1),

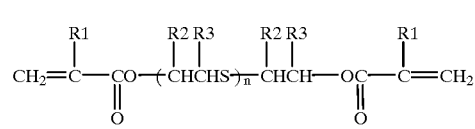

wherein R1, R2 and R3 may be the same or different and are hydrogen atoms or methyl groups, and n is an integer of 1 to 10, and 0.001 to 10 parts by weight of a photochromic compound.

10 Claims, No Drawings

PHOTOCHROMIC CURABLE COMPOSITION

BACKGROUND OF THE INVENTION

1. Field of the Invention

The present invention relates to a photochromic curable composition suited for the production of a photochromic cured product having excellent optical properties such as a high refractive index and a large Abbe's number, having favorable photochromic properties such as a large color density, and having good fatigue resistance, and to a photochromic lens obtained by curing the photochromic curable composition.

2. Prior Art

Photochromism is a phenomenon which is drawing attention in these several years, and stands for a reversible action of a compound; i.e., a compound quickly changes its color when it is irradiated with light containing ultraviolet rays such as of sunlight or light of a mercury lamp, and resumes its initial color when it is no longer irradiated with light and is placed in a dark place. The compound having such a property is called photochromic compound. The compounds having a variety of structures have heretofore been synthesized and proposed.

A photochromic plastic lens is the one that utilizes the photochromism. For example, Japanese Unexamined Patent Publication (Kokai) No. 124790/1991 proposes a photochromic curable composition obtained by dissolving a photochromic compound in a radically polymerizable monomer, and discloses a method of obtaining a photochromic resin by curing the photochromic curable composition. Particularly, this publication teaches the use of the cured product as a photochromic lens. However, many of the cured products taught in these publications have refractive indexes which are not less than 1.55.

It has been desired to provide lenses for spectacles having ever small thicknesses. Therefore, improvement has been forwarded extensively in order to provide a resin that exhibits a high refractive index, and a variety of cured products and monomer compositions have been studied and proposed for producing lenses. However, few studies are concerned to the photochromic lenses having refractive indexes in excess of 1.56, and no technology has been positively developed except the one disclosed in Japanese Unexamined Patent Publication (Kokai) No. 169918/1996. Many styryl compounds have been studied as general highly refractive polymerizable monomers. However, these highly refractive cured products have poor fatigue resistances in the photochromic properties compared to that of the lowly refractive cured products and, besides, have small color densities and are not, hence, utilizable as photochromic lenses. It has further been desired to increase the Abbe's number in order to improve the chromatic aberration of the lenses of the spectacles. In general, however, the Abbe's number decreases with an increase in the refractive index. It is therefore difficult to increase the Abbe's number of the highly refractive plastic lenses for spectacles. Accordingly, it has been desired to provide a sufficiently practicable photochromic curable composition having excellent optical properties such as a high refractive index and a large Abbe's number, and excellent color density and fatigue resistance in the photochromic property.

Japanese Patent No. 2570776 (Japanese Unexamined Patent Publication (Rokai) No. 128966/1989) discloses a sulfur-containing aliphatic acrylic compound that can be cast-polymerized, that gives a cured product having a high refractive index and a large Abbe's number upon the polymerization, and that is expressed by the following formula,

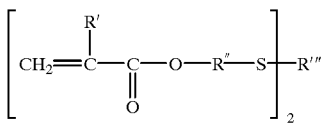

wherein R' is hydrogen or $CH_3$, R" is $-CH_2CH_2-$, and R''' is $-CH_2-$, $-CH_2CH_2-$, $-CH_2CH_2CH_2-$, $-CH_2CH_2CH_2CH_2-$, $-CH_2CH_2SCH_2CH_2-$, or $-CH_2CH_2OCH_2CH_2-$.

However, it has not at all been known to use the above-mentioned sulfur-containing compound in combination with a photochromic compound to obtain a photochromic curable composition.

As a photochromic compound, on the other hand, there has been known, for example, a fulgimide compound. The fulgimide compound develops a color of a tone of orange to blue. A chromene compound and a spirooxazine compound have also been known as photochromic compounds. These compounds develop colors of tones of, generally, orange to yellow in the case of a chromene compound and reddish purple to blue in the case of a spirooxazine compound.

It is generally desired that the photochromic lens generally develops a color of a tone of grey, amber or brown. When the above-mentioned compounds are used alone, however, a desired neutral color is not obtained in many cases. An neutral color can be obtained by mixing a chromene compound, a fulgide compound or a fulgimide compound and a spirooxazine compound having different color tones at any composition ratios. For example, Japanese Unexamined Patent Publication (Kokai) No. 124790/1991 discloses a method of obtaining an neutral color by mixing a chromene compound and a fulgimide compound together, and Japanese Unexamined Patent Publication (Kokai) No. 9469/1993 discloses a method of obtaining an neutral color by mixing a chromene compound and a spirooxazine compound together. Furthermore, DE 4325154 teaches developing various neutral colors in addition to grey, amber and brown by mixing a spirooxazine compound, a chromene compound and a fulgimide compound together.

SUMMARY OF THE INVENTION

It has therefore been desired to develop a new technology to compensate for the above-mentioned defects inherent in the prior art. That is, the object of the present invention is to provide a composition suited for the production of a photochromic cured product having excellent optical properties such as a high refractive index and a large Abbe's number, favorable photochromic properties such as a large color density, and good fatigue resistance, as well as a photochromic lens obtained by curing the photochromic curable composition.

The present inventors have conducted keen study concerning the composition for obtaining a photochromic cured product as represented by a photochromic lens having excellent optical properties such as a high refractive index and a large Abbe's number, favorable photochromic properties, a large color density and excellent fatigue resistance. As a result, the inventors have discovered the fact that a photochromic curable composition containing a particular polymerizable monomer is suited for the production of a photochromic cured product that satisfies the above-mentioned properties, and have thus completed the present invention.

According to the present invention, there is provided a photochromic curable composition comprising 100 parts by weight of a polymerizable monomer containing at least 10% by weight of a sulfur-containing (meth)acrylate polymerizable monomer represented by the following general formula (1),

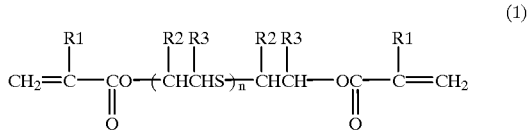

wherein R1, R2 and R3 may be the same or different and are hydrogen atoms or methyl groups, and n is an integer of 1 to 10, and 0.001 to 10 parts by weight of a photochromic compound.

In the photochromic curable composition of the present invention, it is desired that:
1. The sulfur-containing (meth)acrylate polymerizable monomer is:
   a bis(2-methacryloyloxyethylthioethyl) sulfide;
   a bis(2-acryloyloxyethylthioethyl) sulfide;
   a bis(2-methacryloyloxyisopropylthioisopropyl) sulfide;
   a bis(2-methacryloyloxyethyl) sulfide; or a 1,2-bis(2-methacryloyloxyethylthio) ethane;
2. The sulfur-containing (meth)acrylate polymerizable monomer is a polymerizable monomer prepared by the ester interchange of a (meth)acrylic acid ester and an alcohol; and
3. The polymerizable monomer comprises:
   (A) 100 parts by weight of the sulfur-containing (meth)acrylate polymerizable monomer expressed by the above-mentioned general formula (1);
   (B) 1 to 100 parts by weight of an epoxy-containing (meth)acrylate polymerizable monomer represented by the following general formula (2),

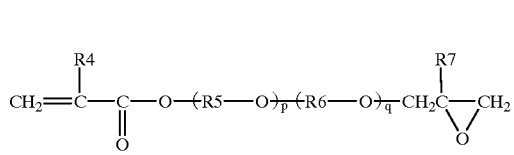

wherein R4 and R7 may be the same or different and are hydrogen atoms or methyl groups, R5 and R6 are the same or different alkylene groups having 1 to 4 carbon atoms, which may be substituted with a hydroxyl group, or a group represented by the formula

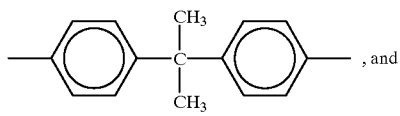

, and p and q are 0 or 1, respectively,
   (C) 0 to 500 parts by weight of a (meth)acrylate polymerizable monomer other than the above-mentioned components (A) and (B); and
   (D) 0 to 200 parts by weight of a styryl polymerizable monomer; and
4. The above-mentioned polymerizable monomer contains:
   100 parts by weight of the above-mentioned component (A);

1 to 80 parts by weight, particularly, 1 to 70 parts by weight and, more particularly, 2 to 70 parts by weight of the above-mentioned component (B);
   0 to 500 parts by weight, particularly, 0 to 400 parts by weight and, more particularly, 0 to 200 parts by weight of the above-mentioned component (C); and
   0 to 100 parts by weight, particularly, 1 to 100 parts by weight and, more particularly, 1 to 70 parts by weight of the above-mentioned component (D);
   and when the above-mentioned photochromic curable composition is polymerized and is cured, there is obtained a cured product having a refractive index of not smaller than 1.52, particularly, not smaller than 1.54 and, more particularly, not smaller than 1.57.

According to the present invention, there is further provided a photochromic lens obtained by curing the above-mentioned photochromic curable composition.

DETAILED DESCRIPTION OF THE PREFERRED EMBODIMENTS (Polymerizable monomer)

In the photochromic curable composition of the present invention, the polymerizable monomer contains at least 10% by weight of a sulfur-containing (meth)acrylate polymerizable monomer represented by the above-mentioned general formula (1).

In the polymerizable monomer represented by the general formula (1) of the present invention, the substituents R2 and R3 are, preferably, hydrogen atoms from the standpoint of increasing the refractive index of the cured product that is obtained. Furthermore, n is an integer which may be 1 to 10 but, particularly, 1 to 5 from the standpoint of heat resistance and hardness of the cured product that is obtained.

Concrete examples of the polymerizable monomer represented by the general formula (1) include bis (methacryloyloxyethyl) sulfide, bis(acryloyloxyethyl) sulfide, 1,2-bis(methacryloyloxyethylthio) ethane, 1,2-bis (acryloyloxyethylthio) ethane, bis(2-methacryloyloxyethylthioethyl) sulfide, bis(2-acryloyloxyethylthioethyl) sulfide, 1,2-bis (methacryloyloxyethylthioethylthio) ethane, 1,2-bis (acryloyloxyethylthioethylthio) ethane, 1,2-bis (methacryloyloxyisopropylthioisopropyl) sulfide, and 1,2-bis(acryloyloxyisopropylthioisopropyl) sulfide.

The effect of the present invention is exhibited even by a single polymerizable monomer expressed by the general formula (1). In order to improve the moldability of the composition, physical properties, optical properties and photochromic properties of the obtained cured product, however, there may be added one or two or more kinds of radically polymerizable monomers which are copolymerizable therewith. In order to maintain a high refractive index and a large Abbe's number of the obtained cured product, however, the amount of the polymerizable monomer represented by the general formula (1) is not smaller than 10% by weight and, preferably, from 10 to 90% by weight with respect to the polymerizable monomers that are copolymerizable therewith. More preferably, the amount of the polymerizable monomer represented by the general formula (1) lies over a range of from 20 to 90% by weight.

The sulfur-containing (meth)acrylic acid ester polymerizable monomer of the present invention can be prepared by a known method and, preferably, by an ester interchange method. The ester interchange method is the one in which an alcohol derivative which is a precursor of a desired (meth) acrylic acid ester polymerizable monomer is reacted with a (meth)acrylic acid ester as represented by methyl (meth) acrylate, in order to form the desired (meth)acrylic acid ester polymerizable monomer and an alcohol due to the starting (meth)acrylic acid ester.

Generally, the (meth)acrylic acid ester is produced by (1) a method of subjecting an alcohol derivative which is a precursor of the desired (meth)acrylic acid ester polymerizable monomer and the (meth)acrylic acid to the dehydration condensation, (2) a method of reacting the alcohol derivative which is the precursor of the desired (meth) acrylic acid ester polymerizable monomer with a (meth) acrylic acid chloride in the presence of a base, (3) a method of reacting the alcohol derivative which is the precursor of the desired (meth)acrylic acid ester polymerizable monomer with a (meth)acrylic acid anhydride, and (4) a method of subjecting the alcohol derivative which is the precursor of the desired (meth)acrylic acid ester polymerizable monomer and a (meth)acrylic acid ester to the ester interchange reaction.

Most of the commercially available (meth)acrylic acid esters used for the photochromic material for producing lenses of spectacles are those produced by the method (1). When a commercially available (meth)acrylic acid ester is used for the photochromic material and when a fulgimide compound is used as the photochromic compound, fatigue resistance in the photochromic properties is not exhibited to a sufficient degree. When an oxazine compound or a chromene compound is used as the photochromic compound, on the other hand, the initial color is produced to a striking degree and, besides, fatigue resistance is not exhibited to a sufficient degree. When the sulfur-containing (meth)acrylic acid ester polymerizable monomer synthesized by the method (2) or (3) is used, on the other hand, no initial color is produced but the fatigue resistance is not enough.

On the other hand, when the sulfur-containing (meth) acrylic acid ester polymerizable monomer synthesized by the ester interchange method (4) is used, the initial color of the oxazine compound or the chromene compound is not exhibited and, besides, improved fatigue resistance is exhibited by these compounds and by the fulgimide compound. Though the mechanism for exhibiting this effect is not yet clear, it is presumed that trace amounts of impurities due to the starting materials exist in the reactions (1) to (3) to deteriorate the photochromic properties.

There is no particular limitation on the ester interchange method between the (meth)acrylic acid ester and the alcohol, and any method may be employed. Described below are representative methods that are generally favorably employed.

The alcohol which is a starting material of the desired sulfur-containing (meth)acrylic acid ester polymerizable monomer is an alcohol derivative which is a precursor of the desired (meth)acrylic acid ester polymerizable monomer.

The (meth)acrylic acid ester which is another starting material can be used without any limitation. It is not, however, desired to use those (meth)acrylic acid esters which form alcohols having too high molecular weights or too high boiling points. That is, it is desired to use such a (meth)acrylic acid ester that forms an alcohol having a molecular weight and a boiling point lower than those of the alcohol which is another starting material. The most preferred and concrete example of the (meth)acrylic acid ester which is another starting material is the methyl (meth) acrylate.

By using various catalysts, the ester interchange can be conducted at a high reaction rate maintaining a high yield. Any known catalysts can be used without any limitation. Generally, there can be used an acid catalyst such as sulfuric acid or p-toluenesulfonic acid, or a base catalyst such as potassium alkoxide, sodium alkoxide, potassium hydroxide, sodium hydroxide, potassium carbonate, cesium hydroxide, or cesium carbonate. Preferably, a base catalyst is used. More preferably, cesium carbonate is used. A combination of the base catalyst with an phase-transfer catalyst is also effective. As the phase-transfer catalyst, there can be used a quaternary ammonium salt such as tetramethylammonium bromide, tetrabutylammonium bromide or benzyltriethylammonium bromide; a quaternary phosphonium salt such as tetrabutylphosphonium chloride or tetraphenylphosphonium bromide; or a crown ether such as 18 crown 6 or dibenzo 18 crown 6. From the standpoint of cost and toxicity, however, it is desired to use a quaternary ammonium salt.

The ester interchange can be accomplished by using various solvents. Examples of the generally employed solvent include hydrocarbon solvents such as hexane, cyclohexane, heptane, benzene, toluene and xylene; ether solvents such as ethyl ether, tetrahydrofuran and dioxane; halogen solvents such as dichloromethane, chloroform and dichloroethane; and ketone solvents such as acetone, 2-butanone and cyclohexanone. These solvents may be suitably selected depending upon the catalyst that is used. Preferably, however, a hydrocarbon solvent is used.

The reaction temperature is generally from 0 to 200° C. though there is no particular limitation. When the reaction temperature is too low, an extended period of time is required before the ester interchange reaches an equilibrium. When the reaction temperature is too high, gelation may occur. Therefore, the reaction temperature is preferably from 30 to 150° C. and, more preferably, from 50 to 120 C.

The reaction time is generally from 1 to 50 hours though it varies depending upon the reaction temperature. When the reaction temperature lies within a preferred range, the reaction time is from 2 to 40 hours and, preferably, from 3 to 30 hours.

The ester interchange is an equilibrium reaction. In order to execute the ester interchange reaction at a large rate maintaining a high yield, therefore, it is desired to carry out the reaction while removing the alcohol formed as a result of reaction from the reaction system. The alcohol can be removed by any known method without limitation. Concrete examples will be a method of removing alcohol by distillation and a method of removing alcohol by permitting alcohol to be adsorbed by an adsorbing agent such as a molecular sieve or the like.

It is desired to carry out the ester interchange reaction by adding a polymerization inhibitor thereto in order to prevent the polymerization of an alkyl ester of (meth)acrylic acid which is the starting material and of the reaction product. As the polymerization inhibitor, there can be used any known compound without limitation. Concrete examples include phenolic polymerization inhibitors such as hydroquinone, p-methoxyphenol, 2,6-di-t-butyl-4-methylphenol, and p-t-butylcatechol; phenothiazine, copper chloride (II), iron chloride (III), etc. Among them, it is desired to use the p-methoxyphenol and p-t-butylcatechol from the standpoint of ability for inhibiting the polymerization, color of the formed product, and easiness for removing the product from the reaction product after the reaction. The amount of using the polymerization inhibitor varies depending upon the kind of the inhibitor and the reaction temperature but is, generally, from 0.01 to 10% by weight and, preferably, from 0.1 to 5% by weight of the alcohol that is used.

In the present invention, concrete examples of the compound that can be favorably used as a polymerizable monomer which is copolymerizable with the polymerizable monomer represented by the general formula (1) include:

monofunctional (meth)acrylate polymerizazle monomers such as glycidyl (meth)acrylate, β-methylglycidyl (meth)acrylate, bisphenol A-monoglycidylether methacrylate, 4-glycidyloxybutyl methacrylate, 3-(glycidyl-2-oxyethoxy)-2-hydroxypropyl methacrylate, 3-(glycidyloxy-2-isopropyloxy)-2-hydroxypropyl acrylate, 3-(glycidyloxy-2-hydroxypropyloxy)-2-hydroxypropyl acrylate, methyl (meth)acrylate, ethyl (meth)acrylate, butyl (meth)acrylate, isobornyl (meth)acrylate, benzyl (meth)acrylate, phenyl (meth)acrylate, tribromophenyl (meth)acrylate, 2-hydroxyethyl (meth)acrylate, phenoxyethyl (meth)acrylate, phenoxypolyethyleneglycol (meth)acrylate, alkoxypolyethyleneglycol (meth)acrylate, alkoxypolypropyleneglycol (meth)acrylate and trifluoromethyl (meth)acrylate;

polyfunctional (meth)acrylate polymerizable monomers such as triethyleneglycol dimethacrylate, tetraethyleneglycol dimethacrylate, nonaethyleneglycol dimethacrylate, tetradecaethyleneglycol dimethacrylate, tripropyleneglycol dimethacrylate, tetrapropyleneglycol dimethacrylate, nonapropyleneglycol dimethacrylate, nonaethyleneglycol diacrylate, polybutyleneglycol di(meth)acrylate, 1,6-hexanediol di(meth)acrylate, neopentylglycol di(meth)acrylate, 2,21-bis(4-methacryloyloxyethoxyphenyl)propane, 2,2'-bis(4-methacryloyloxy-polyethoxyphenyl)propane, 2,2'-bis(4-methacryloyloxypropoxyphenyl)propane, 2,2'-bis(4-methacryloyloxy-polypropoxyphenyl)propane, 2,2'-bis(3,5-dibromo-4-methacryloyloxyethoxy)propane, acrylic acid and methacrylic acid ester compounds of hydrogenated bisphenol A ethylene oxide or propylene oxide adduct, dimethyloltricyclodecane di(meth)acrylate, dimethyloltricyclodecanepolyethoxy di(meth)acrylate, trimethylolpropane tri(meth)acrylate, pentaerithritol tetra(meth)acrylate, reaction product of ethylene glycol or polyethylene glycol and glycidyl (meth)acrylate, reaction product of propylene glycol or polypropylene glycol and glycidyl (meth)acrylate, reaction product of bisphenol A ethylene oxide or propylene oxide adduct and glycidyl (meth)acrylate, reaction product of hydrogenated bisphenol A ethylene oxide or propylene oxide adduct and glycidyl (meth)acrylate, and urethane acrylate; and styryl polymerizable monomers such as styrene, chlorostyrene, α-methylstyrene, α-methylstyrene dimer, vinyl naphthalene, isopropenyl naphthalene, bromostyrene and divinyl benzene.

These (meth)acrylate polymerizable monomers and/or styryl monomers can be used in a single kind or in two or more kinds being mixed together.

In the present invention, a particularly preferred polymerizable monomer is in the form of a composition of monomers comprising:

(A) 100 parts by weight of the sulfur-containing (meth)acrylate polymerizable monomer represented by the above-mentioned general formula (1);

(B) 1 to 100 parts by weight of the epoxy-containing (meth)acrylate polymerizable monomer represented by the above-mentioned general formula (2);

(C) 0 to 500 parts by weight of the (meth)acrylate polymerizable monomer other than the above-mentioned components (A) and (B); and (D) 0 to 200 parts by weight of the styryl polymerizable monomer.

Preferred examples will now be described in further detail.

In the composition of the above-mentioned polymerizable monomers, the epoxy-containing (meth)acrylate polymerizable monomer (B) represented by the general formula (2) is the most preferred monomer among the monomers copolymerizable with the sulfur-containing (meth)acrylate polymerizable monomer (A) represented by the general formula (1).

In the general formula (2), it is desired that the substituent R4 is a hydrogen atom from the standpoint of the refractive index of the cured product, and is a methyl group from the standpoint of the stability of the polymerizable monomer. It is desired that R7 is a hydrogen atom from the standpoint of easy availability and cost of the starting material. Alkylene groups denoted by R5 and R6 will be methylene groups, ethylene groups, propylene groups, butylene groups, trimethylene groups or tetramethylene groups. The alkylene groups may be those in which the hydrogen atom is substituted by a hydroxyl group.

Concrete examples of the epoxy-containing (meth)acrylate polymerizable monomer include glycidyl acrylate, glycidyl methacrylate, β-methylglycidyl acrylate, β-methylglycidyl methacrylate, bisphenol A-monoglycidylether methacrylate, 4-glycidyloxybutyl methacrylate, 3-(glycidyl-2-oxyethoxy)-2-hydroxypropyl methacrylate, and 3-(glycidyloxy-2-hydroxypropyloxy)-2-hydroxypropyl acrylate. The component (B) represented by the general formula (2) may be used in one kind or in two or more kinds being mixed together.

The component (B) may be used in an amount over a range of from 1 to 100 parts by weight per 100 parts by weight of the component (A). There tends to take place an optical distortion when the amount of the component (B) is smaller than 1 part by weight. When the amount of the component (B) is larger than 100 parts by weight, on the other hand, the composition tends to exhibit an increased coefficient of water absorption and an increased coefficient of contraction on polymerization, and the effect of the invention does not tends to be sufficiently exhibited.

There is no particular limitation on the component (C) provided it is a (meth)acrylate polymerizable monomer other than the polymerizable monomers represented by the above-mentioned general formulas (1) and (2).

The above-mentioned (meth)acrylate polymerizable monomer can be used as the component (C). However, the (meth)acrylate polymerizable monomer which is particularly preferably used is the one represented by the following general formula (3), (3)

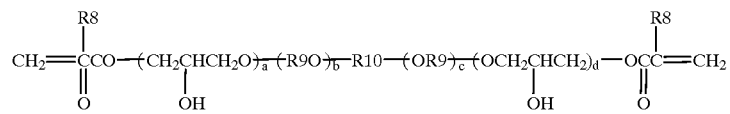

wherein R8 is a hydrogen atom or a methyl group, R9 is an ethylene group or a propylene group, a, b, c and d are integers of 0 to 10, and bonding hands are represented when these integers are 0, and R10 is an alkylene group having 2 to 10 carbon atoms, which may include an oxygen atom or a sulfur atom, or is a group represented by the following formula,

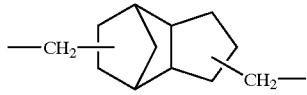

or a group represented by the formula,

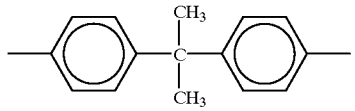

or a group represented by the formula,

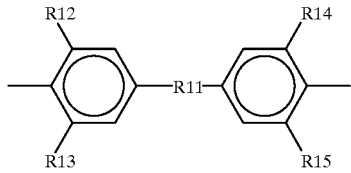

wherein R11 is an alkylene group having 1 to 3 carbon atoms or a sulfur atom, R12, R13, R14 and R15 may be the same or different and are halogen atoms but excluding fluorine atoms, or a group represented by the formula,

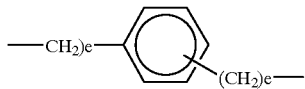

wherein e is an integer of 0 to 2, or the one represented by the following formula (4),

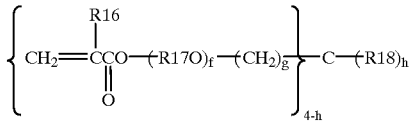

(4)

wherein R16 is a hydrogen atom or a methyl group, R17 is an ethylene group or a propylene group, f is an integer of 0 to 10, g is 0 or 1, and a bonding hand is represented when g is 0, h is an integer of 0 to 2, R18 is a hydrogen atom, a hydroxymethyl group or an alkyl group such as methyl group or ethyl group, or the one represented by the following formula (5),

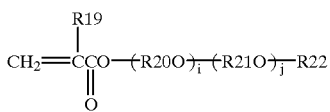

(5)

wherein R19 is a hydrogen atom or a methyl group, R20 and R21 are the same or different alkylene groups having 1 to 4 carbon atoms, which may be substituted with a hydroxyl group, respectively, or are groups represented by,

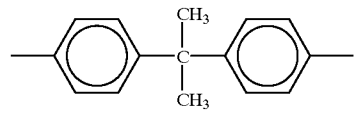

R22 is an alkyl group having 1 to 3 carbon atoms, which may be substituted with a hydroxyl group, an aryl group having 6 to 12 carbon atoms, which may have a substituent, or an aralkyl group having 7 to 15 carbon atoms, which may have a substituent, and i and j are 0 or 1, respectively.

Concrete examples of the (meth)acrylate polymerizable monomers represented by the above-mentioned general formulas (3), (4) and (5) include:

bifunctional (meth)acrylate polymerizable monomers represented by the general formula (3), such as ethyleneglycol di(meth)acrylate, diethyleneglycol di(meth)acrylate, triethyleneglycol di(meth)acrylate, tetraethyleneglycol di(meth)acrylate, polyethyleneglycol di(meth)acrylate, propyleneglycol di(meth)acrylate, dipropyleneglycol di(meth)acrylate, tripropyleneglycol di(meth)acrylate, tetrapropyleneglycol di(meth)acrylate, polypropyleneglycol di(meth)acrylate, 1,6-hexanediol di(meth)acrylate, neopentylglycol di(meth)acrylate, 2,2-bis[4-(meth)acryloyloxyphenyl]propane, 2,2-bis[4-(meth)acryloyloxyethoxyphenyl]propane, 2,2-bis[4-(meth)acryloyloxy-polyethoxyphenyl]propane, 2,2-bis[4-(meth)acryloyloxypropoxyphenyl]propane, 2,2-bis[4-(meth)acryloyloxy-polypropoxyphenyl]propane, 2,2-bis[(3,5-dibromo-4-(meth)acryloyloxyethoxy)phenyl]propane, bis,[4-((meth)acryloyloxyethoxy)phenyl]sulfide, (meth)acrylic acid ester compound of bisphenol A-ethylene oxide or propylene oxide adduct, dimethyloltricyclodecane di(meth)acrylate, dimethyloltricyclodecanepolyethoxy di(meth)acrylate, trimethylolpropane tri(meth)acrylate, pentaerithritol tetra(meth)acrylate, (meth)acrylic acid ester compound of glycidyl alcohol adduct of ethylene glycol or polyethylene glycol, (meth)acrylic acid ester compound of glycidyl alcohol adduct of propylene glycol or polypropylene glycol, (meth)acrylic acid ester compound of bisphenol A ethylene oxide, propylene oxide or glycidyl alcohol adduct, (meth)acrylic acid ester compound of hydrogenated bisphenol A ethylene oxide, propylene oxide or glycidyl alcohol adduct, 1,4-bis(methacryloyloxyethoxy)benzene, 1,4-bis(methacryloyloxyethoxymethyl)benzene, and 1,4-bis(methacryloyloxyethoxyethyl)benzene;

trifunctional or higher functional (meth)acrylate polymerizable monomers represented by the general formula (4), such as trimethylolpropane tri(meth)acrylate and pentaerithritol tetra(meth)acrylate; and monofunctional (meth)acrylate polymerizable monomers represented by the general formula (5), such as glycidyl (meth)acrylate, 2-hydroxyethyl (meth)acrylate, benzyl (meth)acrylate, (meth)acryloyloxyethoxybenzene, 2-(meth)acryloyloxyethoxynaphthalene and 1-(meth)acryloyloxymethylnaphthalene.

These (meth)acrylic acid ester polymerizable monomers may be used in one kind or in two or more kinds being mixed together.

The component (C) may be added in an amount of 0 to 500 parts by weight per 100 parts by weight of the component (A). The effects of the present invention can be exhibited without adding the component (C). However, the component (C) may be added in order to adjust various properties such as refractive index, Abbe's number, hardness and specific gravity. when the amount of the component (C) exceeds 500 parts by weight, the effects of the component (A) are not exhibited, i.e., a high refractive index and a small coefficient of water absorption are not exhibited to a sufficient degree. Therefore, the component (C) may be added in an amount over a range of from 0 to 500 parts by weight.

There is no particular limitation on the component (D) provided it is a styryl polymerizable monomer. A preferred example of the component (D) is the above-mentioned styryl polymerizable monomer.

The component (D) may be added in an amount of 0 to 200 parts by weight per 100 parts by weight of the component (A). The effects of the present invention can be exhibited without adding the component (D). However, the component (D) may be added in order to adjust various properties such as refractive index, specific gravity and the rate of polymerization. When the amount of the component (D) exceeds 200 parts by weight, the effects of the component (A) are not exhibited, i.e., a large Abbe's number and excellent fatigue resistance are not exhibited to a sufficient degree. Therefore, the component (D) may be added in an amount over a range of from 0 to 200 parts by weight.

In general, the Abbe's number decreases with an increase in the refractive index of the cured product. It is therefore strongly desired to increase the Abbe's number of a cured product that has a high refractive index. The cured product of the present invention exhibits a large Abbe's number despite it has a high refractive index, which is a feature of the invention. For example, a cured product obtained by curing a diethylene glycol (bisallyl carbonate) exhibits a refractive index which is as low as 1.50 but an Abbe's number of about 52 which is large enough for practical use. However, a dimethacrylate of a bisphenol compound exhibits a refractive index which is as high as 1.57 but an Abbe's number of about 35 which is not satisfactory.

It is therefore desired that a cured product obtained by curing the curable composition of the invention has a high refractive index and, concretely, not smaller than 1.52, preferably, not smaller than 1.54 and, more preferably, not smaller than 1.57. A large Abbe's number which is the effect of the invention is chiefly due to the component (A). It is therefore desired that the curable composition contains the component (A) at a large ratio. For this purpose, it is desired that the component (A) is contained in an amount of not smaller than 12.8% by weight when it is desired to obtain a refractive index of the cured product of not smaller than 1.52, contained in an amount of not smaller than 14.9% by weight when it is desired to obtain a refractive index of not smaller than 1.54, and is contained in an amount of not smaller than 22.7% by weight when it is desired to obtain a refractive index of not smaller than 1.57.

(Photochromic compound)

Any photochromic compound can be used in the present invention without limitation provided it exhibits a photochromic action. There have been known such photochromic compounds as fulgide compound, chromene compound and spirooxazine compound, which can be used in the present invention. As the photochromic compounds, there can be favorably used those that have been known in U.S. Pat. No. 4882438, U.S. Pat. No. 4960678, U.S. Pat. No. 5130058, U.S. Pat. No. 5106998, International Laid-Open Patent No. 9422854, International Laid-Open Patent No. 9505371, U.S. Pat. No. 4913544 and European Laid-Open Patent No. 0600669. These photochromic compounds can be used in one kind or in two or more kinds being mixed together, and their blending ratios may be determined depending upon the use.

Among the photochromic compounds that can be favorably used in the present invention, the chromene compound can be represented by the general formula (6),

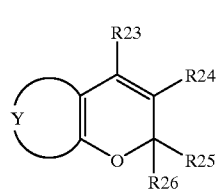

(6)

wherein R23, R24, R25 and R26 may be the same or different and are hydrogen atoms, alkyl groups, aryl groups that may have a substituent, substituted amino groups, saturated heterocyclic groups or unsaturated heterocyclic groups, wherein R25 and R26 together may form a ring, and a divalent group represented by the following formula

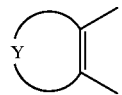

is a divalent aromatic hydrocarbon group or a divalent unsaturated heterocyclic group that may have a substituent.

In the above formula (6), the alkyl groups represented by R23, R24, R25 and R26 may be those alkyl groups having 1 to 4 carbon atoms, such as methyl groups, ethyl groups, n-propyl groups, isopropyl groups, n-butyl groups, isobutyl groups, or t-butyl groups, and the aryl groups may be those aryl groups having 6 to 10 carbon atoms, such as phenyl groups, tolyl groups, xylyl groups or naphthyl groups. In the aryl group, at least one hydrogen atom may be substituted. In this case, the substituent may be an alkoxyl group having 1 to 4 carbon atoms, such as methoxyl group, ethoxyl group, n-propoxyl group, isopropoxyl group, n-butoxyl group, isobutoxyl group or t-butoxyl group; a halogen atom such as fluorine atom, chlorine atom or bromine atom; a perfluoroalkoxyl group such as trifluoromethoxyl group; a substituted amino group such as dimethylamino group or diethylamino group; or a nitrogen-containing heterocyclic group such as morpholino group or piperidinyl group.

As the substituted amino group, there can be exemplified an amino group in which at least one hydrogen atom is substituted by the alkyl group or the aryl group, such as methylamino group, dimethylamino group, ethylamino group, diethylamino group, diisopropylamino group, phenylamino group or diphenylamino group. As the saturated heterocyclic group, there can be exemplified a monovalent group derived from a 5- to 6-membered ring including 1 or 2 nitrogen atoms, oxygen atoms or sulfur atoms as ring-constituting atoms, such as pyrrolidine ring, imidazolidine ring, piperidine ring, piperazine ring or morpholine ring. As the unsaturated heterocyclic group, there can be exemplified a group having 4 to 9 carbon atoms derived from furan ring, benzofuran ring, thiophene ring, benzothiophene ring, pyrrole ring, indole ring, pyridine ring, quinoline ring or isoquinoline ring.

In the above-mentioned formula (6), the ring formed by R25 and R26 together may be a norbornylidene group or a bicyclo[3.3.1] 9-nonylidene group.

In the above-mentioned formula (6), furthermore, the divalent aromatic hydrocarbon group represented by the formula

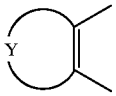

may be a divalent group derived from a condensed ring of one benzene ring or 2 to 3 benzene rings. As the divalent unsaturated heterocyclic group, there can be exemplified a divalent group derived from a 5- to 7-membered ring containing 1 or 2 oxygen atoms, nitrogen atoms or sulfur atoms as ring-constituting atoms or from a ring thereof condensed with a benzene ring. Concrete examples of the divalent aromatic hydrocarbon group include those groups having 6 to 14 carbon atoms derived from benzene ring, naphthalene ring, phenanthrene ring or anthracene ring. Concrete examples of the divalent unsaturated heterocyclic group include those groups having 4 to 9 carbon atoms derived from furan ring, benzofuran ring, pyridine ring, quinoline ring, isoquinoline ring, pyrrole ring, thiophene ring or benzothiophene ring.

In the divalent aromatic hydrocarbon group or unsaturated heterocyclic group, at least one hydrogen atom may be substituted. In this case, though there is no particular limitation, the substituent will be a halogen atom such as chlorine, bromine or iodine; an alkyl group having 1 to 10 carbon atoms, such as methyl group, ethyl group, n-propyl group, isopropyl group, n-butyl group, isobutyl group or t-butyl group; an alkoxyl group having 1 to 10 carbon atoms, such as methoxyl group, ethoxyl group, n-propoxyl group, isopropoxyl group, n-butoxyl group, isobutoxyl group or t-butoxyl group; an aryl group having 6 to 10 carbon atoms, such as phenyl group, tolyl group or xylyl group; an alkoxyaryl group having 7 to 14 carbon atoms (an aryl group having 6 to 10 carbon atoms substituted with an alkoxyl group having 1 to 4 carbon atoms); a substituted amino group having 1 to 10 carbon atoms, such as methylamino group, dimethylamino group, ethylamino group, diethylamino group, or diisopropylamino group; a nitrogen-containing heterocyclic group having 1 to 10 carbon atoms bonded to an aromatic hydrocarbon group or to an unsaturated heterocyclic group through a nitrogen atom, such as pyrrolidinyl group, piperidinyl group, morpholino group, thiomorpholino group, n-methylpiperazinyl group or indolinyl group; nitro group; or cyano group.

As the chromene compound, there can be preferably used a compound in which R23 and R24 are both hydrogen atoms, R25 and R26 may be the same or different and are aryl groups or unsaturated heterocyclic groups which may have a substituent, or may form a bicyclo[3.3.1] 9-nonylidene group or a norbornylidene group being bonded to each other, and

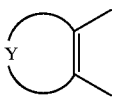

may be preferably a group derived from a naphthalene group, which may be substituted with an alkyl group having 1 to 10 carbon atoms, an alkoxyl group having 1 to 10 carbon atoms or a nitrogen-containing heterocyclic group having 4 to 10 carbon atoms.

Concrete examples of the chromene compound that can be favorably used in the present invention are as follows:
1) Spiro[norbornane-2,2'-[2H]benzo[h]chromene];
2) Spiro[bicyclo[3.3.1]nonane-9,2'-[2H]benzo[h]chromene];
3) 7'-Methoxyspiro[bicyclo[3.3.1]nonane-9,2'-[2H]benzo[h]chromene];
4) 7'-Methoxyspiro[norbornane-2, 2'-[2H]benzo[h]chromene];
5) 3,3-Bis(3-fluoro-4-methoxyphenyl)-6-morpholino-3H-benzo[f]chromene;
6) 3,3-Bis(4-methoxyphenyl)-6-morpholino-3H-benzo[f]chromene;
7) 3-(3-Trifluoromethyl-4-methoxyphenyl)-3-(4-methoxyphenyl)-6-thiomorpholino-3H-benzo[f]chromene;
8) 5-Isopropyl-2,2-diphenyl-2H-benzo[h]chromene; and
9) 5-Isopropyl-2,2-bis(4-morpholinophenyl)-2H-benzo[h]chromene.

The spirooxazine compound that is favorably used in the present invention can be expressed by the following general formula (7),

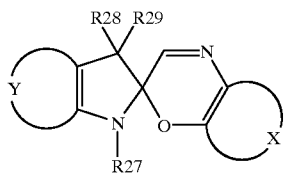

(7)

wherein R27, R28 and R29 may be the same or different and are alkyl groups, cycloalkyl groups, cycloaralkyl groups, alkoxyl groups, alkoxyalkyl groups, alkoxycarbonyl groups, alkoxycarbonylalkyl groups, aryl groups, aralkyl groups, aryloxyl groups, acyl groups, acyloxyl groups, substituted amino groups or nitrogen-containing heterocyclic groups, R28 and R29 may form a ring being bonded to each other, and R27, R28 and R29 may have a substituent which may be a halogen atom, a nitro group, a cyano group or a heterocyclic group in addition to the above-mentioned groups.

Alkyl groups represented by R27, R28 and R29 in the general formula (7) may be those alkyl groups having 1 to 10 carbon atoms, such as methyl groups, ethyl groups, propyl groups, butyl groups, isobutyl groups, pentyl groups and neopentyl groups. Cycloalkyl groups may be those cycloalkyl groups having 3 to 10 carbon atoms, such as cyclopropyl groups, cyclopentyl groups and cyclohexyl groups. Cycloaralkyl groups may be those cycloaralkyl groups having 4 to 11 carbon atoms, such as cyclopropylmethyl groups, cyclohexylmethyl groups and 2-cyclohexylethyl groups. Alkoxyl groups may be those alkoxyl groups having 1 to 10 carbon atoms, such as methoxyl groups, ethoxyl groups, n-propoxyl groups, iso-propoxyl groups, n-butoxyl groups, isobutoxyl groups and t-butoxyl groups. Alkoxyalkyl groups may be those alkoxyalkyl groups having 2 to 11 carbon atoms, such as methoxymethyl groups, ethoxymethyl groups, t-butoxymethyl groups, methoxyethyl groups, ethoxyethyl groups and t-butoxyethyl groups. Alkoxycarbonyl groups may be those alkoxycarbonyl groups having 2 to 11 carbon atoms, such as methoxycarbonyl groups, ethoxycarbonyl groups, n-propoxycarbonyl groups, isopropoxycarbonyl groups, n-butoxycarbonyl groups, isobutoxycarbonyl groups and t-butoxycarbonyl groups. Alkoxycarbonylalkyl groups may be those alkoxycarbonylalkyl groups having 3 to 12 carbon atoms, such as methoxycarbonylmethyl groups, methoxycarbonylethyl groups and ethoxycarbonylmethyl groups. Aryl groups may be those aryl groups having 6 to 12 carbon atoms, such as phenyl groups, tolyl groups, xylyl groups and naphthyl groups. Aralkyl groups may be those aralkyl groups having 7 to 14 carbon atoms, such as benzyl groups, phenetyl groups and naphthylmethyl groups. Aryloxyl groups may be those aryloxyl groups having 6 to 12 carbon atoms, such as phenoxyl groups and naphthoxyl groups. Acyl groups are those acyl groups having 2 to 14 carbon atoms, such as acetyl groups, propionyl groups, butyryl groups and benzoyl groups. Acyloxyl groups are those acetoxyl groups having 2 to 14 carbon atoms, such as acetoxyl groups, propionyloxyl groups, butyryloxyl groups and benzoyloxyl groups. Substituted amino groups may be those amino groups having 1 to 10 carbon atoms, such as methylamino groups, dimethylamino groups, ethylamino groups, diethylamino groups, diisopropylamino groups. Nitrogen-containing heterocyclic groups may be those nitrogen-containing heterocyclic groups having 1 to 10 carbon atoms bonded to a spirooxazine skeleton through a nitrogen atom, such as pyrrolidinyl groups, piperidino groups, morpholino groups, thiomorpholino groups, N-methylpiperazinyl groups and indolyl groups.

In the general formula (7), furthermore, the divalent group represented by,

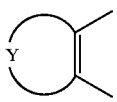

is a divalent aromatic hydrocarbon group or a divalent unsaturated heterocyclic group which may be substituted, and may be the same group as the one exemplified in connection with the chromene compound represented by the general formula (6).

In the general formula (7), the divalent group represented by,

is a divalent aromatic hydrocarbon group or a divalent unsaturated heterocyclic group which may be substituted. As the divalent aromatic hydrocarbon group, there can be exemplified those divalent groups derived from a benzene ring or a condensed ring of 2 or 3 benzene rings. As the divalent unsaturated heterocyclic group, there can be exemplified divalent groups derived from a 5- to 7-membered ring containing 1 or 2 oxygen atoms, nitrogen atoms or sulfur atoms as ring-constituting atoms, or from a ring thereof condensed with a benzene ring. Concrete examples of the divalent aromatic hydrocarbon group include those groups having 6 to 14 carbon atoms derived from benzene ring, naphthalene ring, phenanthrene ring or anthracene ring. Furthermore, concrete examples of the divalent unsaturated heterocyclic group include those groups having 4 to 9 carbon atoms derived from furan ring, benzofuran ring, pyridine ring, quinoline ring, isoquinoline ring, pyrrole ring, thiophene ring or benzothiophene ring.

As the substituent for the above-mentioned divalent aromatic hydrocarbon group or the divalent unsaturated heterocyclic group, there can be selected those groups same as the ones represented by R27, R28 and R29. Among them, it is desired to use a divalent aromatic hydrocarbon group or a divalent unsaturated heterocyclic group substituted by a group represented by

—NR$^{30}$R$^{31}$ wherein R30 and R31 may be the same or different and are alkyl groups, alkoxyl groups or aryl groups which may be substituted, and R30 and R31 may be bonded or cyclized together to form a nitrogen-containing heterocyclic ring, from the standpoint of initial photochromic properties such as a high color density.

Concrete examples of the spirooxazine compound that can be favorably used in the present invention are as follows:
1) 1'-Methoxycarbonylmethyl-8"-methoxyl-6"-(4-methylpiperazino)dispiro(cyclohexane-1,3'-(3H)indole-2'-(1'H),3"-(3H)naphtho(3,2-a)(1,4)oxazine);
2) 6'-Fluoro-1', 5'-dimethyl-6"-morpholinodispiro (cyclohexane-1,3'-(3H)indole-2'-J1'H),3"1-(3H)naphtho (3,2-a)(1,4)oxazine);
3) 6'-Fluoro-5'-methyl-1'-isobutyl-6"-morpholinodispiro (cyclohexane-1,3'-(3H)indole-2'-(1'H),3"-(3H)naphtho(3, 2-a)(1,4)oxazine);
4) 3',3'-Dimethyl-1'-isopropyl-6"-indolinospiro-(3H)indole-21-(1'H),3"-(3H)naphtho(3,2-a)(1,4)oxazine; and
5) 3',3'-Dimethyl-1'-isobutylspiro-(3H)indole-2'-(1'H),3"-(3H)naphtho(3,2-a)(1,4)oxazine.

The fulgide compound that is favorably used in the present invention can be represented by the general formula (8), (8)

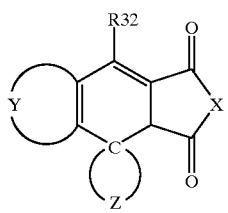

wherein

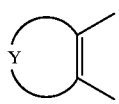

is a divalent aromatic hydrocarbon group or a divalent unsaturated heterocyclic group that may have a substituent, R32 is an alkyl group, an aryl group or a monovalent heterocyclic group,

is a norbornylidene group or an adamantylidene group, X is an oxygen atom, a group >N-R33, a group >N-A$^1$-B$^1$-(A$^2$)$_m$(B$^2$)$_n$—R$^{34}$, a group >N-A$^3$-A$^4$, or a group >N-A$^3$-R$^{35}$,
wherein R33 is a hydrogen atom, an alkyl group or an aryl group, and A1, A2 and A3 may be the same or different and are alkylene groups, alkylidene groups, cycloalkylene groups or alkylcycloalkane-diil groups, and B1 and B2 may be the same or different and are groups,

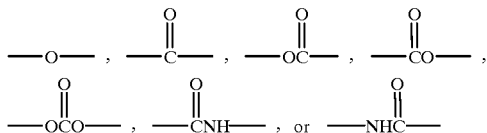

wherein m and n are 0 or 1 independently from each other and when m is 0, n is 0, R34 is an alkyl group, a naphthyl group or a naphthylalkyl group, A4 is a naphthyl group, and R35 is a halogen atom, a cyano group or a nitro group.

In the above-mentioned formula (8), the divalent aromatic hydrocarbon group or the divalent unsaturated heterocyclic group represented by

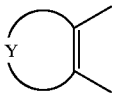

is the same as those groups mentioned in connection with the above-mentioned formula (6), and the substituents for these groups may be the same as the substituents for the divalent aromatic hydrocarbon groups or the divalent unsaturated heterocyclic groups mentioned in connection with the chromene compound represented by the above-mentioned formula (6).

In the above-mentioned formula (8), the alkyl group, aryl group and heterocyclic group represented by R32 may be an alkyl group having 1 to 4 carbon atoms, an aryl group having 6 to 10 carbon atoms and a monovalent group derived from a 5- to 7-membered ring containing 1 or 2 oxygen atoms, nitrogen atoms or sulfur atoms as ring-constituting atoms or from a ring thereof condensed with a benzene ring. Concrete examples of the alkyl group include methyl group, ethyl group, propyl group, butyl group and cyclopropyl group. Furthermore, concrete examples of the aryl group include phenyl group, tolyl group and xylyl group. Concrete examples of the heterocyclic group include those groups that are based on nitrogen-containing heterocyclic rings such as pyrrole ring, pyridine ring, quinoline ring and piperidine ring; oxygen-containing heterocyclic rings such as furan ring, benzofuran ring and oxoran ring; and sulfur-containing heterocyclic rings such as thiophene ring, benzothiophene ring and thioran ring.

When X is >N—$R^{33}$ in the above-mentioned formula (8), the alkyl group and aryl group represented by R33 are the same as those represented by R32. When X is >N—$A^1$-$B^1$-$(A^2)_m$-$(B^2)_n$-$R^{34}$, >N—$A^3$-$A^4$ or >N-$A^3$-$R^{35}$, it is desired that the alkylene group represented by $A^1$, A2 or A3 is the one having 1 to 4 carbon atoms, such as methylene group, ethylene group, propylene group, trimethylene group or tetramethylene group, that the alkylidene group is the one having 2 to 4 carbon atoms, such as ethylidene group, propylidene group or isopropylidene group, that the cycloalkylene group is a cyclohexylene group, and that the alkylcycloalkane-diyl group is a dimethylcyclohexane-diyl group.

When X is >N—$A^1$-$B^1$-$(A^2)_m$-$(B^2)_n$-$R^{34}$ in the above-mentioned formula (8), furthermore, it is desired that the alkyl group represented by R34 is the same as the one represented by R32, and that the naphthylalkyl group is the one having 11 to 14 carbon atoms, such as naphthylmethyl group, naphthylethyl group, naphthylpropyl group or naphthylbutyl group.

Among the fulgide compounds represented by the above-mentioned formula (8), it is desired to use a compound in which R32 is an alkyl group, X is >N—R [wherein R is a cyanoalkyl group having 1 to 4 carbon atoms, a nitroalkyl group having 1 to 4 carbon atoms or an alkoxycarbonylalkyl group having 3 to 9 carbon atoms (inclusive of an alkoxyl group having 1 to 4 carbon atoms and an alkylene group having 1 to 4 carbon atoms],

is an adamantylidene group, and

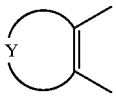

is a heterocyclic group which may be substituted by an aryl group having 6 to 10 carbon atoms or an alkoxyaryl group having 7 to 14 carbon atoms (aryl group having 6 to 10 carbon atoms substituted by an alkoxyl group having 1 to 4 carbon atoms) and, particularly, a group derived from a thiophene ring, from the standpoint of fatigue resistance in the photochromic action.

Concrete examples of the fulgide compounds that can be favorably used in the present invention are as described below. Fulgide compounds:

1) N-Cyanomethyl-6,7-dihydro-4-methyl-2-phenylspiro(5, 6-benzo[b]thiophenedicarboxyimide-7,2-tricyclo[3.3.1.1] decane);
2) N-Cyanomethyl-6,7-dihydro-2-(p-methoxyphenyl)-4-methylspiro(5,6-benzo[b]thiophenedicarboxyimide-7,2-tricyclo[3.3.1.1]decane);
3) N-Cyanomethyl-6,7-dihydro-4-methylspiro(5,6-benzo[b]thiophenedicarboxyimide-7,2-tricyclo[3.3.1.1] decane);
4) 6,7-Dihydro-N-methoxycarbonylmethyl-4-methyl-2-phenylspiro(5,6-benzo[b]thiophenedicarboxyimide-7,2-tricyclo[3.3.1.1]decane);
5) 6,7-Dihydro-4-methyl-2-(p-methylphenyl)-N-nitromethylspiro(5,6-benzo[b]thiophenedicarboxyimide-7,2-tricyclo[3.3.1.1]decane);
6) N-Cyanomethyl-6,7-dihydro-4-cyclopropyl-3-methylspiro(5,6-benzo[b]thiophenedicarboxyimide-7,2-tricyclo[3.3.1.1]decane);
7) N-Cyanomethyl-6,7-dihydro-4-cyclopropylspiro(5,6-benzo[b]thiophenedicarboxyimide-7,2-tricyclo[3.3.1.1] decane); and
8) N-Cyanomethyl-6,7-dihydro-2-(p-methoxyphenyl)-4-cyclopropylspiro(5,6-benzo[b]thiophenedicarboxyimide-7,2-tricyclo[3.3.1.1]decane).

When the curable composition of the present invention is used for the lenses of spectacles, a color tone of grey or brown is preferred. However, this color tone is not obtained by using a single photochromic compound. Therefore, two or more kinds of different photochromic compounds are used being mixed together. The above-mentioned fulgide compound and the spirooxazine compound generally develop orange to blue colors. Upon mixing a chromene compound that develops orange to yellow color thereto, it is allowed to obtain an neutral color such as grey or brown.

In the present invention, the photochromic compound is blended in an amount of from 0.001 to 10 parts by weight per 100 parts by weight of the whole polymerizable monomers. When its amount is smaller than 0.001 part by weight, fatigue resistance in the photochromic properties is lost. When its amount is not smaller than 10 parts by weight, on the other hand, the cured product develops an initial color to a large extent. The photochromic compound is blended in an amount of preferably, from 0.01 to 5 parts by weight and, more preferably, from 0.01 to 1 part by weight per 100 parts by weight of the whole polymerizable monomers. Within this range, there are obtained the most favorable photochromic properties maintaining a balance between the fatigue resistance and the initial color.

As required, furthermore, the photochromic curable composition of the present invention may be blended with a variety kinds of stabilizers and additives, such as releasing agent, ultraviolet ray-absorbing agent, infrared ray-absorbing agent, ultraviolet ray stabilizer, antioxidant, coloring-preventing agent, antistatic agent, fluorescent dye, dye, pigment, perfume, etc.

It is desired to blend the photochromic curable composition of the present invention with an ultraviolet ray-absorbing agent, since this makes it possible to further enhance the fatigue resistance of the photochromic compound.

Any known ultraviolet ray-absorbing agent that has been added to various plastic materials, can be used without limitation. Examples of the ultraviolet ray-absorbing agent that can be favorably used in the present invention include benzotriazole ultraviolet ray-absorbing agent, benzophenone ultraviolet ray-absorbing agent, salicylic acid ultraviolet ray-absorbing agent, and cyanoacrylate ultraviolet ray-absorbing agent.

Among the above-mentioned ultraviolet ray-absorbing agents, the benzotriazole ultraviolet ray-absorbing agent is particularly effective in improving the fatigue resistance. Any known benzotriazole ultraviolet ray-absorbing agent can be used without limitation provided it has a benzotriazole skeleton and ultraviolet ray-absorbing ability. For example, there can be preferably used a benzotriazole ultraviolet ray-absorbing agent represented by the following general formula (9),

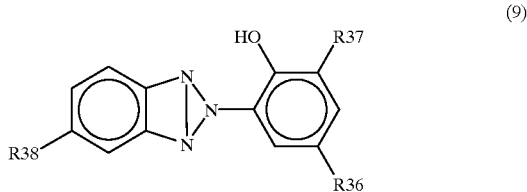

(9)

wherein R36 and R37 may be the same or different, and are hydrogen atoms, alkyl groups, aryl groups or aralkyl groups, and R38 is a hydrogen atom or a chlorine atom.

In the above-mentioned general formula (9), alkyl groups represented by R36 and R37 may be those alkyl groups having 1 to 10 carbon atoms, such as methyl groups, butyl groups, sec-butyl groups or t-butyl groups. Aryl groups may be those aryl groups having 6 to 20 carbon atoms, such as phenyl group, butylphenyl group, sec-butylphenyl group or t-butylphenyl group. Aralkyl groups may be those aralkyl groups having 7 to 20 carbon atoms, such as benzyl groups or phenylethyl groups.

A preferred benzotriazole ultraviolet ray-absorbing agent is the one represented by the general formula (9) wherein R36 and R37 may be the same or different and may be alkyl groups having 1 to 5 carbon atoms and, particularly, methyl groups, t-butyl groups or amyl groups, aryl groups having 6 to 15 carbon atoms and, particularly, methylphenyl groups, t-butylphenyl groups, t-octylphenyl groups or aralkyl groups having 7 to 15 carbon atoms and, particularly, benzyl groups or α, α-dimethylbenzyl groups.

Concrete examples of the benzotriazole ultraviolet ray-absorbing agent that can be favorably used in the present invention include the following compounds:

(1) 2-(5-Methyl-2-hydroxyphenyl)benzotriazole [trade name: Tinubin P, produced by Nihon Chiba Geigy Co.];

(2) 2-[2-Hydroxy-3,5-bis(α,α-dimethylbenzyl)phenyl]-2H-benzotriazole [trade name: Tinubin 234, produced by Nihon Chiba Geigy Co.];

(3) 2-(3,5-Di-t-butyl-2-hydroxyphenyl)benzotriazole [trade name: Tinubin 320, produced by Nihon Chiba Geigy Co.];

(4) 2-(3-t-Butyl-5-methyl-2-hydroxyphenyl)-5-chlorobenzotriazole [trade name: Tinubin 326, produced by Nihon Chiba Geigy Co.];

(5) 2-(3,5-Di-t-butyl-2-hydroxyphenyl)-5-chlorobenzotriazole [trade name: Tinubin 327, produced by Nihon Chiba Geigy Co.];

(6) 2-(3,5-Di-t-amyl-2-hydroxyphenyl)benzotriazole [trade name: Tinubin 328, produced by Nihon Chiba Geigy Co.]; and (7) 2-(2'-Hydroxy-5'-t-octylphenyl)benzotriazole [trade name: Tinubin 329, produced by Nihon Chiba Geigy Co.].

There is no particular limitation on the amount of using the ultraviolet ray-absorbing agent. Usually, however, the ultraviolet ray-absorbing agent is used in an amount of from 0.001 to 10 parts by weight and, preferably, from 0.01 to 1 part by weight per 100 parts by weight of the whole polymerizable monomers.

Upon blending an infrared ray-absorbing agent, furthermore, there can be obtained a photochromic cured product having infrared ray-absorbing ability in addition to photochromic action. As the infrared ray-absorbing agent, there can be used a polymethine compound, a diimmonium compound, a cyanine compound, an anthraquinone compound or an aluminum compound. It is, however, desired to use the diimmonium compound since it exhibits a large molecular extinction coefficient and a large effect despite it is added in small amounts.

The infrared ray-absorbing agent is blended in an amount of preferably from 0.0001 to 1 part by weight and, more preferably, from 0.001 to 0.01 part by weight per 100 parts by weight of the whole polymerizable monomers.

(Curing method and cured product)

There is no particular limitation on the polymerization method for obtaining a cured product from the photochromic composition of the present invention, and any known radical polymerization method can be used. The polymerization can be started by using various peroxides or radical polymerization initiators such as azo compounds, or by being irradiated with ultraviolet rays, α-rays, β-rays, γ-rays, or based on both of them. A typical polymerization method is a cast polymerization in which the photochromic composition of the invention blended with a radical polymerization initiator is poured into a mold held by an elastomer gasket or a spacer, cured in the air furnace, and is taken out from the mold.

There is no particular limitation on the radical polymerization initiator and any known compound can be used. Representative examples include diacyl peroxides such as benzoyl peroxide, p-chlorobenzoyl peroxide, decanoyl peroxide, lauroyl peroxide and acetyl peroxide; peroxy esters such as t-butylperoxy-2-ethyl hexanate, t-butylperoxyneodecanate, cumylperoxyneodecanate, t-butylperoxybenzoate and 1,1,3,3-tetramethylbutylperoxy-2-ethyl hexanate; percarbonates such as diisopropylperoxydicarbonate and di-sec-butylperoxydicarbonate; and azo compounds such as azobisisobutyronitrile and the like.

The amount of the radical polymerization initiator varies depending upon the polymerization conditions, kind of the initiator and the composition of the monomers, and cannot be definitely determined. Generally, however, the radical polymerization initiator is used in an amount of from 0.001 to 10 parts by weight and, preferably, from 0.01 to 5 parts by weight per 100 parts by weight of the whole polymerizable monomers.

Among the polymerization conditions, the temperature particularly affects the properties of the photochromic cured product. The temperature may vary depending upon the kind and amount of the polymerization initiator and upon the kinds of the monomers, and cannot be definitely determined. Generally, however, it is desired to conduct the so-called tapered two-stage polymerization in which the polymerization is started at a relatively low temperature, the temperature is gradually elevated, and the polymer is cured at a high temperature after the end of the polymerization. The polymerization time, too, varies depending upon various factors like the temperature, and an optimum time must be determined depending upon the conditions. Generally, the polymerization conditions are so selected that the polymerization is completed in 2 to 40 hours.

Furthermore, the photochromic cured product obtained by the above-mentioned method can be subjected to the below-mentioned treatments depending upon the applications. That is, the photochromic cured product is subjected to the treatment for preventing reflection, to the antistatic treatment and to the secondary treatment by applying thereto a hard coating agent comprising chiefly a dyestuff such as dispersion dye, silane coupling agent, or a sol of silicon, zirconium, antimony, aluminum, tin or tungsten, or depositing a thin metal oxide film such as of $SiO_2$, $TiO_2$, or $ZrO_2$, or applying a high molecular organic thin film.

The cured product obtained by polymerizing the photochromic curable composition of the present invention has excellent optical properties such as a high refractive index and a large Abbe's number and further exhibits photochromic properties such as color density and fatigue resistance which are large enough for practical use. If described in further detail, the cured product obtained by polymerizing the photochromic curable composition of the present invention exhibits photochromic properties such as color density and fatigue resistance which are equal to, or superior to, those of the cured product having a low refractive index, and exhibits excellent optical properties such as a large Abbe's number despite its refractive index is not lower than 1.56. Therefore, the cured product obtained by polymerizing the photochromic composition of the present invention is useful as a highly refractive organic glass having photochromic properties and can be suitably used for such applications as photochromic lenses.

EXAMPLES

The invention will now be concretely described by way of Working Examples to which only, however, the invention is in no way limited.

The compounds used in Examples and their abbreviations are as described below.
(1) Sulfur-containing (meth)acrylate (polymerizable monomer represented by the general formula (1)).
3S4G: Bis(2-methacryloyloxyethylthioethyl) sulfide
3S4GA: Bis(2-acryloyloxyethylthioethyl) sulfide
3S4GP: Bis(2-methacryloyloxyisopropylthioisopropyl) sulfide
1S2G: Bis(2-methacryloyloxyethyl) sulfide
2S3G: 1,2-Bis(2-methacryloyloxyethylthio) ethane
(2) Other monomers.
GMA: Glycidyl methacrylate
BzMA: Benzyl methacrylate
TB: 2,2-Bis[4-methacryloyloxyethoxy-3,5-dibromophenyl] propane
3PG: Tripropyleneglycol dimethacrylate
MS: α-Methylstyrene
MSD: α-Methylstyrene dimer
BPE: 2,2-Bis(4-methacryloyloxyethoxyphenyl)propane
4G: Tetraethyleneglycol dimethacrylate
St: Styrene
XEMA: 1,4-Bis(methacryloyloxyethylthiomethyl)benzene
(3) Photochromic compounds.
C1: Spiro[bicyclo[3.3.1]nonane-9,2'-[2H]benzo[h] chromene]
C2: 3,3-Bis(3-fluoro-4-methoxyphenyl)-6-morpholino-3H-benzo[f]chromene
C3: 5-Isopropyl-2,2-diphenyl-2H-benzo[h]chromene
C4: 5-Isopropyl-2,2-bis(4-morpholinophenyl)-2H-benzo[h]chromene
S1: 6'-Fluoro-1', $5^1$-dimethyl-6"-morpholinodispiro(cyclohexane-1,3'-(3H)indole-2'-(1'H),3"-(3H)naphtho(3,2-a)(1,4)oxazine)
F1: N-Cyanomethyl-6,7-dihydro-2-(p-methoxyphenyl)-4-methylspiro(5,6-benzo[b]thiophenedicarboxyimide-7,2-tricyclo[3.3.1.1]decane)
F2: N-Cyanomethyl-6,7-dihydro-2-(p-methoxyphenyl)-4-cyclopropylspiro(5,6-benzo[b]thiophenedicarboxyimide-7,2-tricyclo[3.3.1.1]decane)
(Preparation of polymerizable monomers).
(Preparation Example 1)

50 Grams (0.21 mols) of a 3,6,9-trithiaundeca-1,11-diol, 120 g (1.20 mols) of a methyl methacrylate, 1.0 g of a cesium carbonate, 1.0 g of a p-methoxyphenol and 30 ml of hexane, were fed and were reacted at a refluxing temperature for 18 hours. During this period, the isolated methanol was removed from the reaction system by the azeotropic distillation with hexane. After the reaction, the hexane and the excess of methyl methacrylate were distilled off, and 90 ml of toluene and 300 ml of hexane were added thereto. After the solid matters such as catalysts used for the reaction were separated by filtration, the mixture solution was washed three times with an aqueous solution containing 10% of sodium hydroxide and another three times with an aqueous solution containing 20% of sodium chloride. 1.5 Grams of activated carbon was added to the organic layer followed by stirring for one hour. Thereafter, the activated carbon was separated by filtration and the solvent was distilled off to obtain a pale yellow oily 3S4G in an amount of 71 g (yield, 91%).

(Preparation Example 2)

A pale yellow oily 2S3G was obtained in an amount of 77 g (yield, 88%) in the same manner as in Preparation Example 1 with the exception of feeding 50 g (0.27 mols) of a 3,6-dithiaoctane-1,8-diol, 160 g (1.60 mols) of a methyl methacrylate, 1.0 g of a potassium carbonate, 1.0 g of a p-methoxyphenol and 30 ml of hexane.

(Preparation Example 3)

A pale yellow oily 1S2G was obtained in an amount of 91 g (yield, 86%) in the same manner as in Preparation Example 1 with the exception of feeding 50 g (0.41 mols) of a thiodiethanol, 230 g (2.30 mol) of a methyl methacrylate, 1.0 g of a potassium t-butoxide, 1.0 g of a p-methoxyphenol and 30 ml of hexane.

(Preparation Example 4)

A pale yellow oily 3S4G was obtained in an amount of 70 g (yield, 90%) in the same manner as in Preparation Example 1 with the exception of feeding 50 g (0.21 mols) of a 3,6,9-trithiaundeca-,11-diol, 120 g (1.20 mols) of a methyl methacrylate, 0.1 g of a cesium carbonate, 1.0 g of a potassium carbonate, 1.0 g of a p-methoxyphenol and 30 ml of hexane.

(Preparation Example 5)

A pale yellow oily 3S4GA was obtained in an amount of 59 g (yield, 82%) in the same manner as in Preparation Example 1 with the exception of feeding 50 g (0.21 mols) of a 3,6,9-trithiaundeca-1,11-diol, 100 g (1.16 mols) of a methyl acrylate, 1.0 g of a potassium carbonate, 1.0 g of a p-methoxyphenol and 30 ml of hexane.

(Preparation Example 6) A pale yellow oily 3S4GP was obtained in an amount of 54 g (yield, 74%) in the same manner as in Preparation Example 1 with the exception of feeding 50 g (0.17 mols) of a bis(hydroxyisopropylthioisopropyl) sulfide, 120 g (1.20 mols) of a methyl methacrylate, 1.0 g of a cesium carbonate, 1.0 g of a p-methoxyphenol and 30 ml of hexane.

(Preparation Example 7)

50 Grams (0.21 mols) of a 3,6,9-trithiaundeca-1,11-diol, 40 g (0.51 mols) of pyridine and 200 ml of chloroform were fed, and the mixture solution was cooled to 50° C. A methacrylic acid chloride in an amount of 48 g (0.46 mols) was dropwisely added thereto at a temperature of not higher than 10° C., and the reaction was conducted for 12 hours. After the reaction, the mixture solution was washed with 10% hydrochloric acid and with an aqueous solution containing 20% of sodium chloride and, then, the solvent was distilled off. The obtained oily product was refined by using a silica gel column chromatography to obtain a colorless transparent 3S4G in an amount of 57 g (yield,73 %).

(Example 1)

90 Parts by weight of the 3S4G as a sulfur-containing (meth)acrylate and 10 parts by weight of the GMA as another polymerizable monomer were mixed together and stirred at room temperature for 2 hours. To the mixture solution were added 0.05 parts by weight of the C1 as a photochromic compound and 1 part by weight of a t-butylperoxy-2-ethyl hexanate as a radical polymerization initiator, which were then mixed well. The mixture solution was poured into a mold constituted by a glass plate and a gasket of an ethylene/vinyl acetate copolymer, and was cast-polymerized. The polymerization was conducted by using an air furnace while gradually elevating the temperature from 30° C. up to 90° C. over a period of 18 hours and maintaining the temperature at 90° C. for 2 hours. After the polymerization, the mold was taken out from the air furnace and was left to cool. Then, a cured product was taken out from the glass mold.

The thus obtained photochromic cured product (2 mm thick) was irradiated with a light beam from a xenon lamp, L-2480 (300 W) SHL-100 manufactured by Hamamatsu Photonics Co., through an aeromass filter (manufactured by Corning Co.) at 20° C.±1° C. maintaining a beam intensity of 365 nm=2.4 mW/cm$^2$ and 245 nm=24 $\mu$W/cm2 for 120 seconds to develop a color, in order to measure photochromic properties as described below.

*Maximum absorption wavelength ($\lambda$max (nm)):

A maximum absorption wavelength $\lambda$max of the cured product after it has developed color was found by using a spectrophotometer, MCPD1000, manufactured by Otsuka Denshi Kogyo Co.

*Color density:

$\epsilon$ (120)–$\epsilon$(0) was found and was regarded to be a color density, where $\epsilon$ (120) is an absorbance at a maximum absorption wavelength of the photochromic compound of when it has developed a color upon being irradiated with light under the above-mentioned conditions for 120 seconds, and $\epsilon$ (0) is an absorbance of the photochromic compound at an absorption wavelength same as that of when it is not irradiated with light to develop color.

*Photochromic fatigue resistance:

Life until fatigue was measured by using a xenon fademeter, FA-25AX-HC, manufactured by Suga Shikenki Co., and was regarded to be a photochromic fatigue resistance. The polymer was irradiated with light from the xenon fademeter for 200 hours, and the cured product was caused to develop color according to the above-mentioned method. Life until fatigue was expressed by a ratio (%) of the absorbance at a maximum absorption wavelength of the photochromic compound that has developed color to the absorbance of the photochromic compound before it is irradiated with light from the fademeter.

Optical properties of the obtained cured product was measured according to the following testing method. Refractive index and Abbe's number:

A refractive index and an Abbe's number were measured at 20° C. by using the Abbe refractometer manufactured by Atago Co. Bromonaphthalene was used as a contact solution.

Measured results were as shown in Table 1.

(Examples 2 to 17)

Photochromic cured products were obtained by conducting the polymerization in the same manner as in Example 1 with the exception of using sulfur-containing (meth) acrylates, other monomers and photochromic compounds shown in Table 1, and their photochromic properties were measured. The results were as shown in Table 1.

TABLE 1

| No. | Polymerizable (parts by wt.) | | Photochromic compounds | | Refractive index | Abbe's numbers | $\lambda$ max (nm) | Color densities (Abs) | Fatigue resistance (%) |
|---|---|---|---|---|---|---|---|---|---|
| | S-containing (meth)acrylates | Other monomers | | (parts by wt.) | | | | | |
| Ex.1 | 3S4G:90 | GMA:10 | C1 | 0.05 | 1.578 | 46 | 452 | 0.93 | 87 |
| Ex.2 | 3S4G:90 | GMA:10 | S1 | 0.05 | 1.578 | 46 | 590 | 0.58 | 90 |
| Ex.3 | 3S4G:90 | GMA:10 | F1 | 0.05 | 1.578 | 46 | 586 | 0.69 | 48 |
| Ex.4 | 3S4GA:90 | GMA:10 | C2 | 0.05 | 1.580 | 46 | 442 | 1.10 | 84 |
| Ex.5 | 3S4GP:90 | GMA:10 | C3 | 0.05 | 1.574 | 46 | 476 | 0.90 | 91 |
| Ex.6 | 3S4G:90 | GMA:5, MS:5, MSD:1 | C2 | 0.05 | 1.583 | 43 | 442 | 1.08 | 86 |
| Ex.7 | 3S4G:90 | GMA:5, MS:5, MSD:1 | C3 | 0.05 | 1.583 | 43 | 476 | 0.92 | 88 |
| Ex.8 | 3S4G:90 | GMA:5, MS:5, MSD:1 | F1 | 0.05 | 1.583 | 43 | 586 | 0.68 | 47 |

TABLE 1-continued

| No. | Polymerizable (parts by wt.) S-containing (meth)acrylates | Polymerizable (parts by wt.) Other monomers | Photochromic compounds | (parts by wt.) | Refractive index | Abbe's numbers | λ max (nm) | Color densities (Abs) | Fatigue resistance (%) |
|---|---|---|---|---|---|---|---|---|---|
| Ex.9 | 3S4G:70 | GMA:5, BzMA:20, MS:5 | S1 | 0.10 | 1.578 | 42 | 590 | 0.60 | 87 |
| Ex.10 | 3S4G:70 | GMA:5, Si:20, MS:5 | C2 | 0.05 | 1.584 | 41 | 442 | 0.94 | 83 |
| Ex.11 | 3S4GA:50 | GMA:10, BPE:30, MS:10 | C3 | 0.05 | 1.575 | 41 | 476 | 0.88 | 88 |
| Ex.12 | 2S3G:70 | GMA:10, BzMA:10, MS:10 | F2 | 0.05 | 1.566 | 45 | 596 | 0.76 | 50 |
| Ex.13 | 1S2G:50 | GMA:5, TB:30, BzMA:15 | C4 | 0.05 | 1.569 | 45 | 572 | 0.52 | 76 |
| Ex.14 | 3S4G:90 | GMA:5, MS:5, MSD:1 | C2 | 0.02 | 1.583 | 43 | 442 | 0.51 | 72 |
|  |  |  | C3 | 0.02 |  |  | 476 | 0.46 | 60 |
|  |  |  | S1 | 0.048 |  |  | 590 | 0.68 | 58 |
|  |  |  | F1 | 0.048 |  |  | 586 | 0.68 | 58 |
| Ex.15 | 3S4G:80 | GMA:5, Si:10, MS:5, MSD:1 | C3 | 0.06 | 1.582 | 42 | 476 | 0.67 | 90 |
|  |  |  | F1 | 0.06 |  |  | 586 | 0.61 | 91 |
| Ex.16 | 354G:100 |  | C1 | 0.05 | 1.585 | 45 | 452 | 0.91 | 89 |
| Ex.17 | 354G:20 | GMA:5, BPE:40, 3PG:30 MS:5, MSD:1 | C2 | 0.05 | 1.550 | 46 | 442 | 0.60 | 72 |
|  |  |  | F1 | 0.12 |  |  | 586 | 0.81 | 61 |

(Comparative Examples 1 to 5, Example 18)

In Comparative Examples 1 to 5 and Example 18, the procedure was carried out quite in the same manner as in Example 1 but using the compounds shown in Table 2 as polymerizable monomers. The results were as shown in Table 2.

The cured product of Comparative Example 1 exhibits excellent photochromic properties but a low refractive index and a small Abbe's number. Therefore, this cured product fails to satisfy a high refractive index and a large Abbe's number, which are the requirements for the spectacle lenses. The cured product of Comparative Example 2 that uses a styryl compound exhibits a refractive index of not smaller than 1.56 but exhibits poor fatigue resistance in the photochromic properties and poor color density. The cured product of Comparative Example 3 which uses a compound of Japanese Unexamined Patent Publication (Kokai) No. 169918/1996 exhibits an excellent refractive index and photochromic properties, but exhibits an Abbe's number which is not large enough. On the other hand, the cured products of the Examples exhibit a refractive index and an Abbe's number which are larger than those of Comparative Examples despite the Abbe's number generally decreases with an increase in the refractive index.

Comparative Examples 4 and 5 deal with the cases where the photochromic compounds F1 and S1 are used while using the polymerizable monomers same as those of Comparative Example 1.

Comparison with these Comparative Examples tells that the cured products of the Examples are practicable enough exhibiting a color density and fatigue resistance comparable to, or greater than, those having low refractive indexes, despite F1 or S1 is used as a photochromic compound.

Example 18 deals with a case where the 3S4G is synthesized from a methacrylic acid chloride and an alcohol (Preparation Example 7). The cured product obtained in Example 18 exhibits an Abbe's number which is large enough but exhibits fatigue resistance which is not large enough compared with Example 6.

TABLE 2

| No. | Polymerizable monomers (parts by wt.) | Photochromic compounds (parts by wt.) |  | Refractive indexes | Abbe's numbers | λ max (nm) | Color densities (Abs) | Fatigue resistance (%) |
|---|---|---|---|---|---|---|---|---|
| Comp.Ex.1 | 4G:90, GMA:10 | C1 | 0.05 | 1.511 | 52 | 452 | 1.06 | 88 |
| Comp.Ex.2 | 4G:25, Si:65, GMA:10 | C2 | 0.05 | 1.562 | 37 | 442 | 0.75 | 53 |
| Comp.Ex.3 | XEMA:90, GMA:10 | C3 | 0.05 | 1.578 | 37 | 476 | 0.82 | 81 |
| Comp.Ex.4 | 4G:90, GMA:10 | F1 | 0.05 | 1.511 | 52 | 580 | 0.73 | 45 |
| Comp.Ex.5 | 4G:90, GMA:10 | S1 | 0.05 | 1.511 | 52 | 590 | 0.64 | 90 |
| Ex.18 | 3S4G:90, GMA:5, MS:5, MSD:1 | C2 | 0.05 | 1.583 | 43 | 442 | 1.10 | 15 |

The 3S4G of comparative Example 6 was synthesized by the reaction of an alcohol derivative with a methacrylic acid chloride.

What is claimed is:

1. A photochromic curable composition comprising 100 parts by weight of a polymerizable monomer containing at least 10% by weight of a sulfur-containing (meth)acrylate polymerizable monomer represented by the following general formula (1),

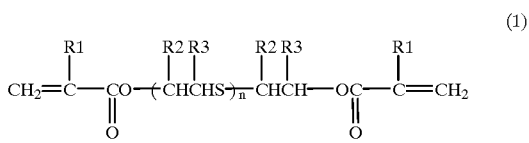

(1)

wherein R1, R2 and R3 may be the same or different and are hydrogen atoms or methyl groups, and n is an integer of 1 to 10, and 0.001 to 10 parts by weight of a photochromic compound.

2. A photochromic curable composition according to claim 1, wherein said sulfur-containing (meth)acrylate polymerizable monomer is:

a bis(2-methacryloyloxyethylthioethyl) sulfide;
a bis(2-acryloyloxyethylthioethyl) sulfide;
a bis(2-methacryloyloxyisopropylthioisopropyl) sulfide;
a bis(2-methacryloyloxyethyl) sulfide; or
a 1,2-bis(2-methacryloyloxyethylthio) ethane.

3. A photochromic curable composition according to claim 1, wherein said sulfur-containing (meth)acrylate polymerizable monomer is a polymerizable monomer produced by the ester interchange of a (meth)acrylic acid ester and an alcohol.

4. A photochromic curable composition comprising a polymerizable monomer containing at least 10% by weight of a sulfur-containing (meth)acrylate polymerizable monomer represented by the following formula (1),

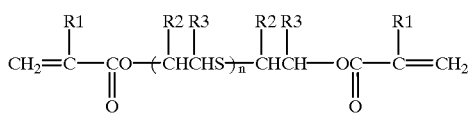
(1)

wherein, R1, R2 and R3 may be the same or different and are hydrogen atoms or methyl groups, and n is an integer of 1 to 10, and 0.001 to 10 parts by weight of a photochromic compound, wherein said polymerizable monomer comprises:
(A) 100 parts by weight of the sulfur-containing (meth) acrylate polymerizable monomer expressed by the formula (1),
(B) 1 to 100 parts by weight of an epoxy-containing (meth)acrylate polymerizable monomer represented by the following formula (2),

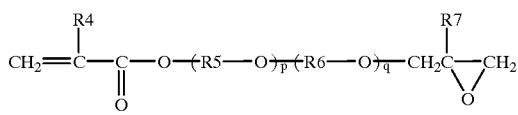
(2)

wherein R4 and R7 may be the same or different and are hydrogen atoms or methyl groups, R5 and R6 are the same or different alkylene groups having 1 to 4 carbon atoms, which may be substituted with a hydroxyl group or a group presented by the formula

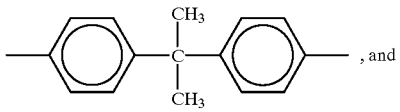
, and p and q are 0 or 1, respectively,
(C) 0 to 500 parts by weight of a (meth)acrylate polymerizable monomer other than the above-mentioned components (A) and (B); and
(D) 0 to 200 parts by weight of a styryl polymerizable monomer.

5. A photochromic curable composition according to claim 4, wherein the above-mentioned polymerizable monomer
100 parts by weight of the above-mentioned component (A);
1 to 80 parts by weight of the above-mentioned component (B);
0 to 500 parts by weight of the above-mentioned component (C); and
0 to 100 parts by weight of the above-mentioned component (D);
and when the above-mentioned photochromic curable composition is polymerized and is cured, there is obtained a cured product having a refractive index of not smaller than 1.52.

6. A photochromic curable composition according to claim 4, wherein the above-mentioned polymerizable monomer contains:
100 parts by weight of the above-mentioned component (A);
1 to 70 parts by weight of the above-mentioned component (B);
0 to 400 parts by weight of the above-mentioned component (C); and
1 to 100 parts by weight of the above-mentioned component (D);
and when the above-mentioned photochromic curable composition is polymerized and is cured, there is obtained a cured product having a refractive index of not smaller than 1.54.

7. A photochromic curable composition according to claim 4, wherein the above-mentioned polymerizable monomer contains:
100 parts by weight of the above-mentioned component (A);
2 to 70 parts by weight of the above-mentioned component (B);
0 to 200 parts by weight of the above-mentioned component (C); and
1 to 70 parts by weight of the above-mentioned component (D);
and when the above-mentioned photochromic curable composition is polymerized and is cured, there is obtained a cured product having a refractive index of not smaller than 1.57.

8. A photochromic lens obtained by curing the photochromic curable composition of claim 1.

9. A photochromic lens obtained by curing the photochromic curable composition of claim 4.

10. A photochromic curable composition comprising a polymerizable monomer containing at least 10% by weight of a sulfur-containing (meth)acrylate polymerizable monomer and 0.01 to 5 parts by weight of a photochromic compound, wherein said polymerizable monomer comprises:
(A) 100 parts by weight of a sulfur-containing (meth) acrylate polymerizable monomer which is at least one member selected from the group consisting of bis (methacryloyloxyethyl) sulfide, bis(acryloyloxyethyl) sulfide, 1,2-bis(methacryloyloxyethylthio) ethane, 1,2-bis(acryloyloxyethylthio) ethane, bis(2-methacryloyloxyethylthioethyl) sulfide, bis(2-acryloyloxyethylthioethyl) sulfide, 1,2-bis (methacryloyloxyethylthioethylthio) ethane, 1,2-bis (acryloyloxyethylthioethylthio) ethane, 1,2-bis (methacryloyloxyisopropylthioisopropyl) sulfide, and 1,2-(bis)acryloyloxyisopropylthioisopropyl) sulfide; and
(B) 2 to 70 parts by weight of an epoxy-containing (meth)acrylate polymerizable monomer which is at least one member selected from the group consisting of glycidyl acrylate, glycidyl methacrylate, β-methylglycidyl acrylate, β-methylglycidyl methacrylate, bisphenol A-monoglycidylether methacrylate, 4-glycidyloxybutyl methacrylate, 3-(glycidyl-2-oxyethoxy)-2-hydroxypropyl methacrylate, and 3-(glycidyloxy-2-hydroxy-propyloxy)-2-hydroxypropyl acrylate.

* * * * *